United States Patent [19]

Snyder

[11] Patent Number: 4,585,946

[45] Date of Patent: Apr. 29, 1986

[54] SELF-CONTAINED UNDERWATER DRAINAGE SYSTEM

[75] Inventor: Kurt I. Snyder, Acme, Pa.

[73] Assignee: Westinghouse Electric Corp., Pittsburgh, Pa.

[21] Appl. No.: 585,064

[22] Filed: Mar. 1, 1984

[51] Int. Cl.$^4$ .................................................. G21F 5/00
[52] U.S. Cl. ................................. 250/506.1; 137/209; 376/272
[58] Field of Search ............... 222/399; 137/212, 209; 251/149.3, 149.6; 376/272, 281; 250/506.1

[56] References Cited

U.S. PATENT DOCUMENTS

| | | | |
|---|---|---|---|
| 706,423 | 8/1902 | Kleinfeldt | 137/212 X |
| 938,517 | 11/1909 | Schmitt | 137/212 X |
| 982,943 | 1/1911 | Evans | 251/149.3 X |
| 3,129,856 | 4/1964 | Jokelson | 222/399 |
| 3,658,179 | 4/1972 | Baumann | 210/66 |

Primary Examiner—Alan Cohan
Attorney, Agent, or Firm—D. M. Satina

[57] ABSTRACT

A self-contained underwater drainage system is disclosed for the automatic draining of water from a container while submerged in a pool of water. The container assembly is constructed of a container for receiving nuclear fuel pellets or other radiation emitting material and a closure to be received within the container. The closure is provided with a liquid egress path communicating between the interior and exterior of the container. A self-contained source of compressed gas within the closure is discharged into the interior of the container for draining the water therefrom through the liquid egress path upon operation of the piston rod by means of its engagement with a portion of the container during use.

16 Claims, 7 Drawing Figures

SELF-CONTAINED UNDERWATER DRAINAGE SYSTEM

BACKGROUND OF THE INVENTION

The present invention relates in general to a self-contained underwater drainage system, and more particularly, to such a system including a container assembly for draining a retained liquid therefrom in an underwater environment, for example, when loading and sealing a container for storage of nuclear fuel pellets, radiation emitting material, and the like, while the container is maintained in a radiation shielding media such as submerged in a pool of water.

In the operation of a nuclear reactor, it is periodically required that the spent nuclear fuel pellets or other radiation emitting material be removed from the reactor core and stored for safe transport to a long term storage area or processing station. As the nuclear fuel pellets or radiation emitting material are a source of dangerous nuclear radiation, which radiation can be lethal, it is required that the reactor operators be shielded from the radiation during placement of the nuclear fuel pellets or radiation emitting material within a shipping or storage container. Typically, this shielding takes the form of a pool of water having a depth of the order of fifteen feet. The nuclear fuel pellets or radiation emitting material, along with the container, are placed submerged at the bottom of the pool whereat the nuclear fuel pellets or radiation emitting material are placed into the container which is then sealed and brought to the surface for storage or shipment. This container, however, is filled with water along with the nuclear fuel pellets or radiation emitting material. The presence of such water in the container can present a substantial problem with respect to some types of radiation emitting material which require that the container be drained of all water prior to storage or shipment. To this end, there is presently unknown in the prior art the construction of a container which can be loaded with nuclear fuel pellets or radiation emitting material, drained of water, and then sealed, all while being maintained at the bottom of a fifteen foot pool of water, and if required, placed in a larger container for ultimate shielding during shipment or storage.

Accordingly, it can be appreciated that there is an unsolved need for a self-contained underwater drainage system which is adapted for loading nuclear fuel elements or radioactive emitting material into a container while positioned at the bottom of a fifteen foot pool of water, and then for draining all retained water therefrom prior to removal of the container from its underwater location so as to minimize operator exposure to any radiation and the resulting dangers.

SUMMARY OF INVENTION

It is broadly an object of the present invention to provide a self-contained underwater drainage system which overcomes or avoids one or more of the foregoing disadvanages resulting from the use of the prior art containers which do not permit the underwater drainage of retained water, and which fullfills the specific requirements of such a self-contained underwater drainage system for use generally with nuclear fuel pellets or radiation emitting material which require dry storage in a container or the like. Specifically, it is within the contemplation of one aspect of the present invention to provide a container assembly which is suitable for draining a container positioned in an underwater environment of all retained fluid by a self-contained source of compressed gas without the need for attachment of the container to external controls such as valves, fittings, and the like.

A further object of the present invention is to provide a self-contained underwater drainage system which minimizes operator exposure to the nuclear fuel pellets or radiation emitting material contained therein.

A still further object of the present invention is to provide a self-contained underwater drainage system which includes a self-contained source of compressed gas operative for discharging retained water within the container in a simple, convenient, and reliable manner.

In accordance with one embodiment of the present invention, there is provided a container assembly for draining a retained liquid therefrom. The assembly is constructed of a container having an opening, a closure removably received within the opening, the closure having a liquid egress path communicating between the interior and exterior of the container, a source of compressed gas within the closure, and control means within the closure for controlling the discharge of the compressed gas from the source into the interior of the container for draining a retained liquid therefrom through the liquid egress path, the control means operative for discharging the compressed gas by engagement of the control means with the container.

In accordance with the above embodiment of the present invention, the control means is operative in a first position for reserving the compressed gas within the closure and operative in a second position for releasing the compressed gas into the interior of the container.

Further in accordance with the above embodiment, the closure is received within the opening of the container between a liquid draining position and a container sealing position, whereby the liquid egress path communicates between the interior and exterior of the container when the closure is in the liquid draining position, and the liquid egress path is prevented from communicating between the interior and exterior of the container when the closure is in the container sealing position.

Still further in accordance with the above embodiment, the closure includes a channel having one end terminating at one surface of the closure within the interior of the container and its other end terminating at another surface of the closure such that the channel is arranged in communication between the interior and exterior of the container when the closure is arranged in the liquid draining position.

Yet still further in accordance with the above embodiment, the container includes a plurality of internal threads and the closure includes a plurality of external threads, whereby the closure is threadingly received within the container, and the internal threads of the container include a channel communicating with the liquid egress path within the closure for permitting the drainage of the retained liquid therethrough from the interior of the container to the exterior thereof.

BRIEF DESCRIPTION OF THE DRAWINGS

The above description, as well as further objects, features, and advantages of the present invention, will be more fully understood by reference to the following detailed description of a presently preferred but nonetheless illustrative, self-contained underwater drainage system in accordance with the present invention, when taken in conjunction with the accompaning drawings, wherein.

DETAILED DESCRIPTION

Figure 1:
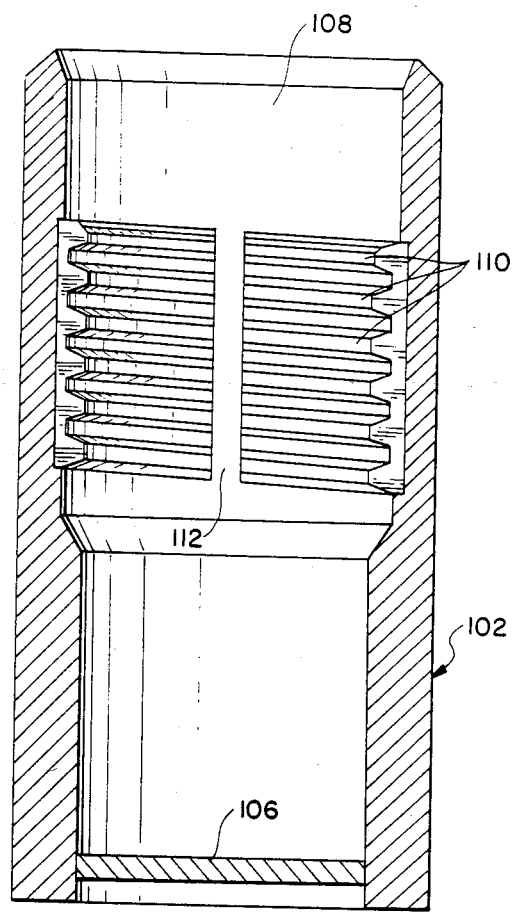
FIG. 1 is a cross-sectional view of a container having an opening and provided with a plurality of internal threads interrupted by a plurality of longitudinally extending circumferentially arranged channels.
Figure 2:
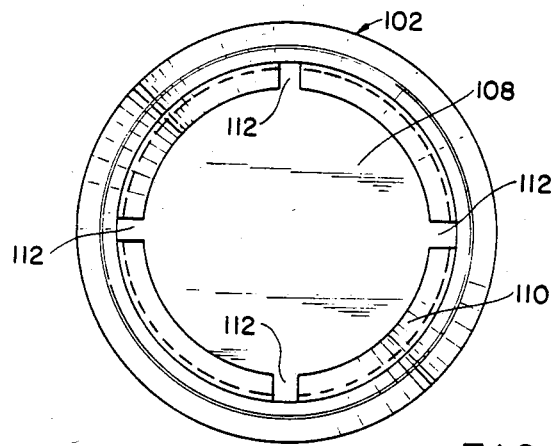
FIG. 2 is a top plan view of the container as shown in FIG. 1 illustrating the circumferential arrangement of the channels and the interruption of the plurality of threads thereby.
Figure 5:
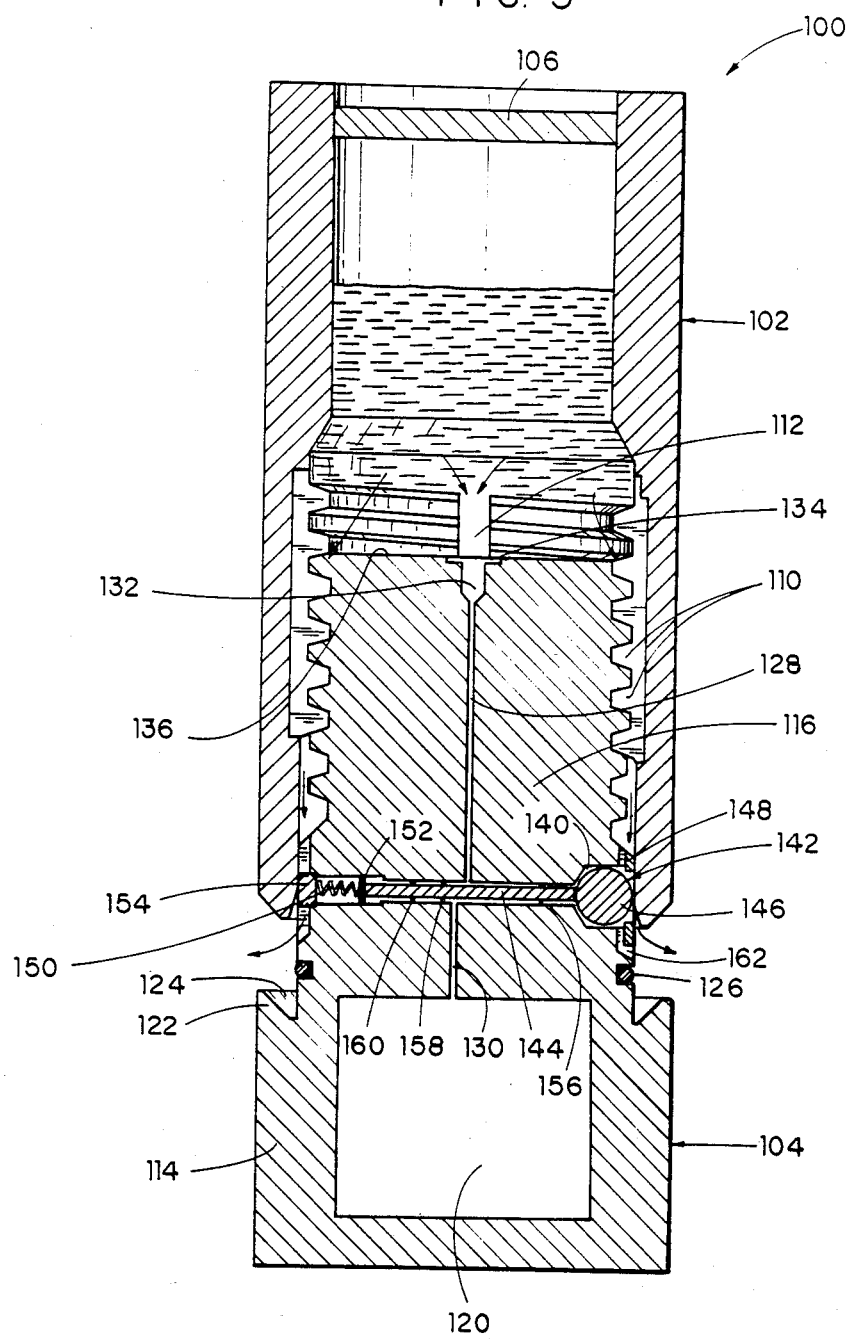
FIG. 5 is a cross-sectional view of the closure of FIG. 3 removably received within the container of FIG. 1 showing the control means in its operative position for discharging compressed gas from the source thereof into the interior of the container for draining retained liquid therefrom through the liquid egress path.
Figure 6:
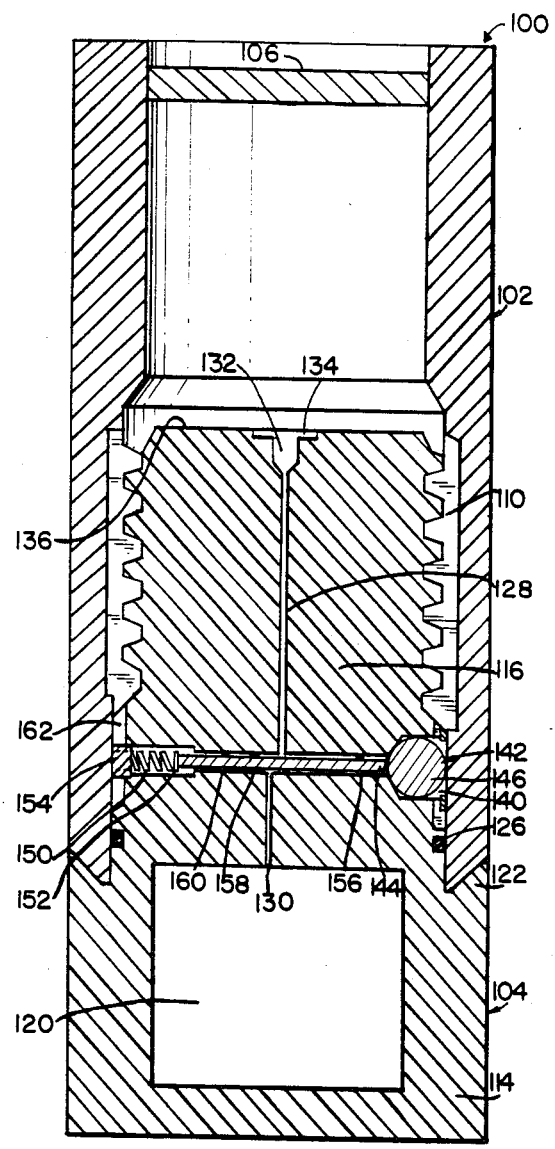
FIG. 6 is a cross-sectional view of the container and closure as shown in FIG. 5 in sealed position with all retained water drained from the container and the control means sealed therein.

Referring now to the drawings, wherein like reference numerals represent like elements, there is shown in FIG. 5 a self-contained underwater drainage system in accordance with the present invention constructed of a container assembly 100 and shown in a retained liquid draining position; while the container assembly of FIG. 6 is shown in a container sealing position. The container assembly 100, as shown in FIGS. 5 and 6, is constructed of a container 102 and a closure 104. The container 102 will be described in detail with respect to FIGS. 1 and 2, while the closure 104 will be described in detailed with respect to FIG. 3. Turning now to FIGS. 1 and 2, the container 102 is cylindrical in shape having a closed end 106 and an open end 108. Located along a portion of the interior surface of the container 102 is provided a plurality of internal threads 110 interrupted by four longitudinally extending channels 112 arranged circumferentially and equally spaced about the interior surface of the container. The channels 112, by interrupting the threads 110, provide communication between the lower portion of the container 102 adjacent the closed end 106 and the upper portion of the container adjacent the open end 108.

Figure 3:
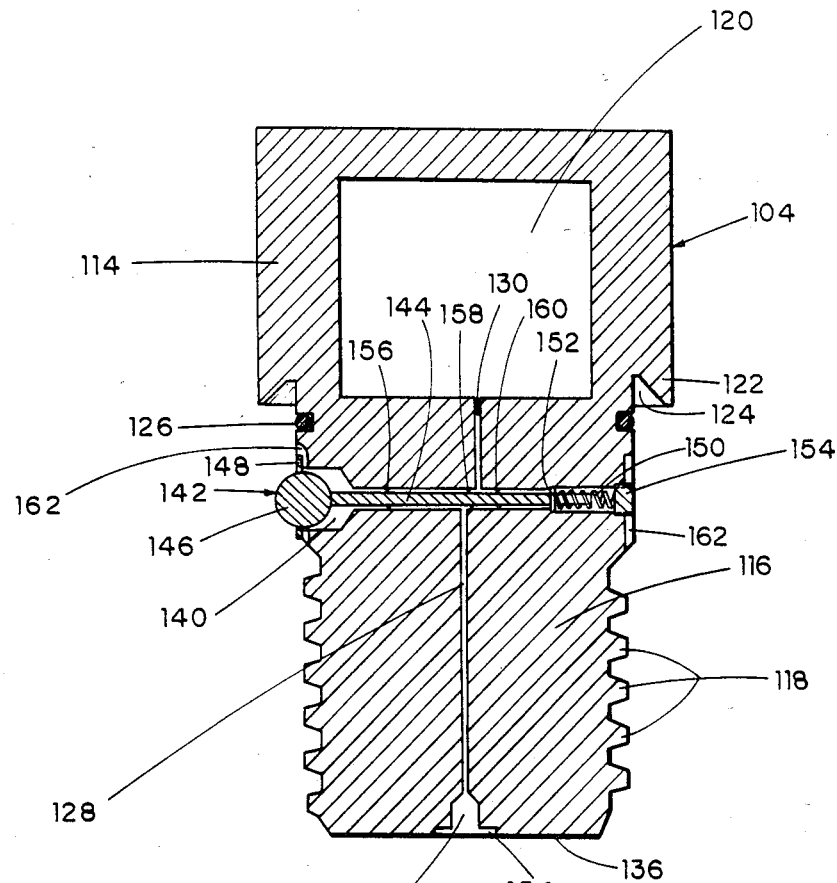
FIG. 3 is a cross-sectional view of a closure having a self-contained source of compressed gas and control means for controlling the discharge of the compressed gas into the interior of the container as shown in FIG. 1.
Figure 4:
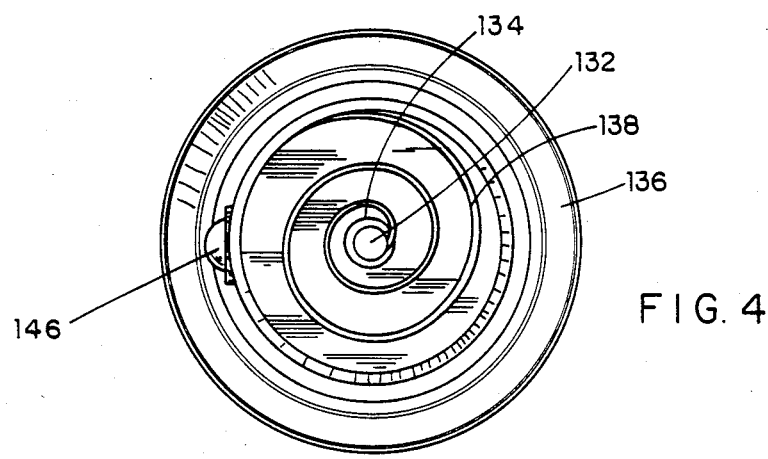
FIG. 4 is a bottom plan view of one embodiment of the present invention wherein a central passageway for the discharge of the compressed gas into the interior of the container is surrounded by a spiral groove within one surface forming one end of the closure.

As shown in FIG. 3, the closure 104 is constructed of a cylindrical head member 114 and a cylindrical lower member 116 having a plurality of external threads 118. The head member 114 includes a cavity 120 providing a source of compressed gas such as air or an inert gas such as nitrogen, argon, and the like. Circumscribing the lower portion of the head member 114 is a V-shaped protrusion 122 forming a V-shaped opening 124. Underlying the V-shaped opening 124 and circumscribing the upper portion of the lower member 116 is an O-ring 126. Extending through the lower member 116 and in communication between the cavity 120 and the exterior of the closure 104 at its lower end is a pair of off-set passageways 128, 130. The lower end of the passageway 128 opens within an enlarged opening 132 surrounded by a groove 134 and terminating at the lower end of the lower member 116 defined by the surface 136. In an alternate embodiment, as shown in FIG. 4, the groove 134 is replaced by an outwardly spiraling groove 138 communicating between the enlarged opening 132 and the periphery of the lower member 116.

A bore 140 extends through the lower member 116 transverse to its longitudinal axis and interrupting the passageways 128, 130 to provide continuous communication therebetween. Movably positioned within the bore 140, between a first position for reserving the compressed gas within the cavity 120 and a second position for releasing the compressed gas into the interior of the container 102, is the control means 142. The control means 142 is constructed of a piston rod 144 having one end riding on a ball 146 retained within the bore 140 by means of a retaining ring 148. The other end of the piston rod 144 is inserted within a bias spring 150 which is attached to the piston rod at one end by a stop ring 152 and engaged at its other end by a stop block 154. Circumferentially positioned about the piston rod 144 is a plurality of O-rings 156, 158, 160 to provide sealing means between the piston rod and the bore 140 as to be described hereinafter. Four liquid egress paths 162 in the form of slots or notches are provided equally spaced circumferentially about the upper portion of the lower member 116 and below the O-ring 126.

The operation of the container assembly 100 for draining a retained liquid from the container 102 will now be described with reference to FIGS. 5 and 6. A container 102, closure 104, and material such as nuclear fuel pellets or radioactive emitting material to be stored are positioned submerged at the bottom of a pool. The container 102, with the material placed inside, is arranged in a vertical orientation with the open end 108 facing upwardly. The closure 104 is threadingly received a few turns within the open end 108 until the ball 146 of the control means 142 is arranged adjacent the leading edge of the container 102 and assumes a first position as shown in FIG. 3 for reserving the compressed gas within the cavity 120. The control means 142, in its first position as shown in FIG. 3, is biased to the left by means of the bias spring 150 being compressed between the stop ring 152 and the stop block 154 within the bore 140. The piston rod 144 is retained within the bore 140 by means of the ball 146 engaging the retaining ring 148. The control means 142, in its first position as shown in FIG. 3, prevents the discharge of the compressed gas from the cavity 120 by the mouth of the passageway 130 being located between the pair of O-rings 158, 160, thus interrupting the communication between the passageways 128, 130.

The container assembly 100 is next inverted into the vertical orientation as shown in FIG. 5 where the container 102 is positioned above the threadingly received closure 104. The closure 104 is rotated a few more turns so as to be increasingly received within the open end 108 of the container 102 until it assumes the position as shown in FIG. 5 where the ball 146 of the control means 142 is engaged by the leading edge of the container. The engagement of the ball 146 with the container 102 causes the piston rod 144 to be moved to the left within the bore 140 against the bias spring 150 and into a second position for discharging the compressed gas stored within the cavity 120 of the closure 104. The control means 142, in this second position, establishes communication between the passageways 128, 130 by means of the bore 140 as a result of the shifting of the location of the O-rings 158, 160 away from the mouth of the passageway 130. In addition, these O-rings 158, 160 prevent the compressed gas from flowing through the bore and out that portion containing the bias spring 150, while the O-ring 156 prevents escape of the compressed gas out through that portion of the bore containing the ball 146.

The compressed gas within the cavity 120 is discharged through the passageways 128, 130 and into the interior of the container 102. The compressed gas can initially be provided within the cavity 120 of the closure 104 by a reverse process. That is, the compressed gas can be supplied through the passageways 128, 130 and into the cavity 120 while the control means 142 is arranged in the compressed gas releasing position as shown in FIG. 5. Likewise, the compressed gas can be provided within the cavity 120 of the closure 104 using a direct connection through a suitable fitting (not shown) if desired. Upon discharge of the compressed gas into the interior of the container 102, the retained liquid, i.e., water, is drained through the plurality of channels 112 within the closure 104 and through the plurality of liquid egress paths 162 provided within the closure 104. As shown, the channels 112 of the container 102 are arranged in communication with the liquid egress paths 162 of the closure 104 for draining water from the interior of the closure along the fluid paths indicated by the unnumbered arrows.

The material (not shown) within the interior of the container 102 is supported by the surface 136 of the lower member 116 of the closure 104. To prevent such material from blocking the passageway 128, this passageway is provided with an enlarged opening 132 surrounded by a further enlarged groove 134. However, where material having a relatively large flat base is received within the container 102, it is desirable that the surface 136 of the lower member 116 be provided with a spiral groove 134 as shown in the embodiment illustrated in FIG. 4. Thus, the potential of blocking the passageway 128 by means of the material within the container 102 is thus prevented. The closure 104 is initially provided with a sufficient pressure of compressed gas within the cavity 120 to displace that quantity of water received within the container 102. For example, a container 102 having a volume of 107.35 cubic inches containing material having a volume of 28.73 cubic inches results in a volume of water to be displaced of 78.6 cubic inches. For a cavity 120 having a volume of 5.18 cubic inches at a pressure of 6.07 psig at fourteen feet of water requires a compressed gas having a pressure of about 332.69 psia. The pressure of the compressed gas is calculated using the standard pressure/volume relationship.

After the retained water has been drained from the container 104, as evidenced by bubbles appearing in the pool, the closure 104 is turned so as to be further threadingly received within the container 102 until it assumes the position as shown in FIG. 6. In this position, the open end 108 of the container 102 is sealed by means of the leading edge being received within the V-shaped opening 124 of the closure 104 and the O-ring 126 sealing against a portion of the internal surface of the lower member 116 of the container. In addition to the open end 108 of the container 102 being sealed by the closure 104, the control means 142 is likewise sealed within the container. The container assembly 100 is returned to its original vertical orientation and can then be placed within a larger radiation shielding container if desired or directly brought to the surface of the pool for storage or shipment as required.

In accordance with the present invention as thus far described, the container assembly 100 is adapted for draining a retained liquid such as water therefrom. The container assembly 100 is constructed of a container 102 having an opening, a closure 104 received within the opening between a liquid draining position and a container sealing position, the closure having a liquid egress path 162 communicating between the interior and exterior of the container when the closure is arranged in the liquid draining position, a source of compressed gas contained within a cavity 120 within the closure and control means 142 within the closure operative between a first and second position for controlling the discharge of the compressed gas from the source into the interior of the container, whereby the retained liquid is drained from the container through the liquid egress path by the compressed gas when the control means is arranged in the second position by engagement with the container within the opening and when the closure is arranged in the liquid draining position.

Figure 7:
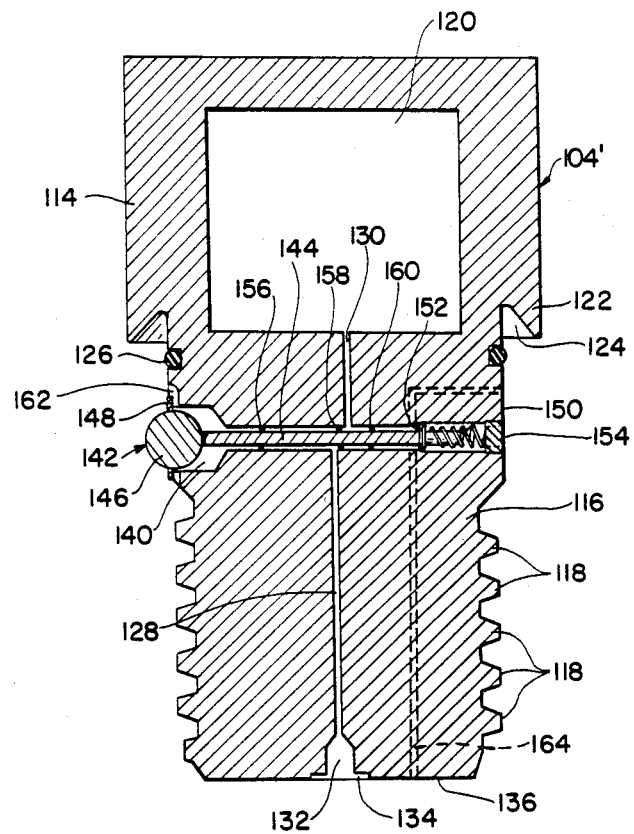
FIG. 7 is a cross-sectional view of a closure in accordance with a second embodiment of the present invention showing a channel arranged for communication between the interior and exterior of the container for draining a retained liquid therefrom.

Although the invention herein has been described with reference to particular embodiments, it is to be understood that these embodiments are merely illustrative of the principles and applications of the present invention. For example, a second embodiment of a closure 104' is illustrated in FIG. 7. In accordance with the closure 104', the lower member 116 is provided with a channel 164 having one end terminated at the surface 136 of the lower member 116 and the other end terminating adjacent the O-ring 126 to provide a fluid path between the interior of the container 102 and the exterior thereof. This embodiment eliminates the liquid egress paths 162 as shown in FIG. 3. Although only one channel 164 is shown, a plurality of such channels may be provided. In addition, the container assembly 100 can be constructed from a variety of materials such as aluminum, stainless steel, copper, lead lined metals, and the like. It is therefore to be understood that numerous modifications may be made in the illustrative embodiment and that other arrangements may be devised without departing from the spirit and scope of the present invention as defined by the appended claims.

What is claimed is:

1. A container assembly for draining a retained liquid therefrom, said assembly comprising a container having an opening including a plurality of internal threads, a closure removably received within said opening, said closure includes a plurality of external threads and said closure is threadingly received within said container opening, said closure having a liquid egress path communicating between the interior and exterior of said container, said internal threads of said container include a channel communicating with said liquid egress path within said closure for permitting the draining of said retained liquid therethrough from the interior of said container to the exterior thereof, a source of compressed gas within said closure, and control means within said closure for controlling the discharge of said compressed gas from said source into said interior of said container for draining a retained liquid therefrom through said liquid egress path, said control means operative for discharging said compressed gas by engagement of said control means with said container.

2. The container assembly as set forth in claim 1, wherein said control means is operative in a first position for reserving said compressed gas within said closure and operative in a second position for releasing said compressed gas into said interior of said container.

3. The container assembly as set forth in claim 2, wherein said control means comprises a piston rod movable between said first and second positions by engagement with said container.

4. The container assembly as set forth in claim 3, wherein said closure includes a passageway communicating between said source of said compressed gas and said interior of said container, said piston rod arranged interrupting said passageway for controlling the discharge of said compressed gas therethrough upon movement of said piston rod between said first and second positions.

5. The container assembly as set forth in claim 1, wherein said closure is received within said opening between a liquid draining position and a container sealing position.

6. The container assembly as set forth in claim 5, wherein said liquid egress path communicates between said interior and said exterior of said container when said closure is in said liquid draining position.

7. The container assembly as set forth in claim 5, wherein said liquid egress path is prevented from communicating between said interior and said exterior of said container when said closure is in said container sealing position.

8. The container assembly as set forth in claim 5, wherein said control means is sealed within said container when said closure is in said container sealing position.

9. A container assembly which is adapted for receiving radioactive material while positioned underwater and then for draining the retained water therefrom, said assembly comprising:
  a container having an opening;
  a closure received within said opening between a liquid draining position and a container sealing position, said closure having a liquid egress path communicating between the interior and exterior of said container when said closure is arranged in said liquid draining position;
  a source of compressed gas contained within said closure;
  gas channels comprising a first gas channel and a second gas channel offset from said first gas channel; and
  control means within said closure comprising a piston rod movably mounted within a bore and provided with plural seal members, said piston rod being biased to a first position for retaining said compressed gas within said closure by blocking with said seal members a portion of said bore which fluidly connects said first and said second gas channels and operative by engagement with said container to be moved to a second position for releasing said compressed gas into said interior of said container by moving said seal members to permit fluid communication between said first and said second gas channels through said portion of said bore to cause said retained liquid to be drained from said container through said liquid egress path by said compressed gas when said control means is arranged in said second position by engagement with said container and when said closure is arranged in said liquid draining position.

10. The container assembly as set forth in claim 9, wherein said piston rod is arranged transverse to the longitudinal axis of said closure.

11. The container assembly as set forth in claim 9, wherein said passageway terminates at a surface defining one end of said closure.

12. The container assembly as set forth in claim 11, wherein said surface includes a groove surrounding said passageway and in communication therewith.

13. The container assembly as set forth in claim 12, wherein said groove is in the form of a spiral extending radially outward from said passageway.

14. The container assembly as set forth in claim 9, wherein said closure includes a channel having one end terminating at one surface of said closure within said interior of said container and the other end thereof terminating at another surface of said closure such that said channel is arranged in communication between said interior and said exterior of said container.

15. The container assembly as set forth in claim 9, wherein said container includes a plurality of internal threads and said closure includes a plurality of external threads, whereby said closure is threadingly received within said container.

16. A water-immersible movable container assembly for receiving radioactive material when totally immersed in water, said container assembly operable to have water displaced therefrom and then sealed prior to removal of the sealed container and the radioactive waste stored therein from the immersing water, said container assembly comprising:
  an elongated hollow member having a closed end portion and an open end portion and interior walls, said elongated hollow member adapted to be immersed in water in a vertical orientation with said open end facing the surface of the water and said closed end positioned away from the surface of the water, and said hollow elongated member adapted to have radioactive waste inserted therein through said open end when immersed in water with the radioactive waste supported within said elongated hollow member by said closed end and said interior walls, and threads provided in a portion of said interior surface of said elongated hollow member which is located near said open end thereof;
  an elongated closure member carrying exterior threads proximate one end thereof, said exterior threads operable to mate with said threads provided on said interior surface of said elongated hollow member, a longitudinal channel which permits the passage of water provided through said mated threads, a liquid egress path communicating between the exterior of said container assembly and said longitudinal channel, and said elongated closure member including a gas pressure tank proximate the other end thereof;
  a bore provided within said closure member between said exterior threaded portion and said pressure tank and transverse to the longitudinal axis of said closure member, a first passageway provided between said one end portion of said closure member and said bore to provide gaseous communication therebetween, a second passageway provided between said pressure tank and said bore to provide gaseous communication therebetween;

a spring-loaded piston positioned within said bore, said piston carrying a plurality of sealing means and the spring loading thereof normally urging said piston to a sealing position so that said sealing means operate to seal against gas passage from said gas pressure tank to said first passageway, a piston actuating member protruding from said bore, said piston actuating member operable to be moved toward said bore to move said piston against the spring loading thereof to move said sealing members carried by said piston to permit gaseous communication between said pressure tank and said first passageway, and a circumferential seal member carried on the exterior surface of said closure member intermediate said exterior threads and said other end of said closure member;

when said elongated hollow member is immersed in water and sufficient radioactive material is contained therein to warrant removal from the immersing water, said closure member containing pressurized gas in said pressure tank is partially threaded into said threaded open end of said elongated hollow member, said elongated hollow member is then inverted in the immersing water so that said closure member is positioned beneath said elongated hollow member, the threading between said closure member and said hollow elongated member is then continued to cause the leading lower interior surface of said elongated hollow member to contact and depress said piston actuating member to move said piston against the spring loading thereof and permit gaseous communication between said pressure tank and said first gas passageway so that gas from said pressure tank rises to said closed end of said hollow elongated member to force water therein downwardly through said longitudinal channel and said water egress path and out of said partially threaded elongated hollow member; and when the water has been forced out of said assembly as evidenced by the presence of gas bubbles in the immersing water, the threading of said closure member and said elongated hollow member is completed so that the leading lower interior edge portion of said elongated hollow member engages said circumferential seal member carried on said closure member to complete the sealing of said assembly to permit said assembly to be removed from the immersing water.

* * * * *